(12) United States Patent
Kato et al.

(10) Patent No.: US 6,740,400 B2
(45) Date of Patent: May 25, 2004

(54) POLY (TRIMETHYLENE TEREPHTHALATE) AND A PROCESS FOR PRODUCING THE SAME

(75) Inventors: Jinichiro Kato, Nobeoka (JP); Yoichiro Azuma, Nobeoka (JP); Katsuhiro Fujimoto, Nobeoka (JP); Teruhiko Matsuo, Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/066,712

(22) Filed: Feb. 6, 2002

(65) Prior Publication Data

US 2003/0050429 A1 Mar. 13, 2003

(30) Foreign Application Priority Data

Feb. 7, 2001 (JP) ......................................... 2001-031288
Mar. 19, 2001 (JP) ......................................... 2001-077474

(51) Int. Cl.$^7$ ............................. D02G 3/00; C08G 63/02
(52) U.S. Cl. .................... 428/364; 528/272; 528/308.6; 528/503
(58) Field of Search ............................. 528/272, 308.6, 528/503; 428/364

(56) References Cited

U.S. PATENT DOCUMENTS 5,798,433 A 8/1998 Schmidt et al. ............. 528/279

FOREIGN PATENT DOCUMENTS

EP 1 046 662 A1 10/2000
JP 2000159875 A 6/2000

*Primary Examiner*—Samuel A. Acquah
(74) *Attorney, Agent, or Firm*—Finnegan, Henderson, Farabow, Garrett & Dunner, L.L.P.

(57) ABSTRACT

A poly(trimethylene terephthalate) comprising 80% by weight or more of trimethylene terephthalate units based on the entire repeating units, having an intrinsic viscosity of from 0.4 to 1.5 dl/g, and satisfying the following formula (1)

$$[-OH]/([-OH]+[-COOH]+[-CH_2CH=CH_2]) \times 100 \geq 40 \quad (1)$$

wherein [—OH], [—COOH] and [—CH$_2$CH═CH$_2$] represent a terminal hydroxyl group content, a terminal carboxyl group content and a terminal allyl group content of the poly(trimethylene terephthalate), respectively. The poly (trimethylene terephthalate) can be produced by reacting terephthalic acid and/or its lower alcohol ester is reacted with 1,3-propanediol to form 1,3-propanediol ester of terephthalic acid and/or its oligomer, and then polycondensation reaction of the reactant is conducted at temperature of from 235 to 270° C. while the above formula (1) is being satisfied to give the above poly(trimethylene terephthalate).

11 Claims, 3 Drawing Sheets

POLY (TRIMETHYLENE TEREPHTHALATE) AND A PROCESS FOR PRODUCING THE SAME

TECHNICAL FIELD

The present invention relates to a poly(trimethylene terephthalate) and a process for producing the same. The present invention relates in more detail to a poly (trimethylene terephthalate) excellent in shade, oxidation resistance stability and melt stability, and a process for producing a poly(trimethylene terephthalate) having a molecular weight in a range from low to high even by polymerization on an industrial scale of the order of tons.

BACKGROUND ART

A poly(trimethylene terephthalate) (hereinafter abbreviated to PTT) fiber obtained by melt spinning a polycondensation product of a lower alcohol ester of terephthalic acid or terephthalic acid and 1,3-propanediol (also termed trimethylene glycol, 1,3-propanediol being abbreviated to PDO below) has various excellent properties that cannot be obtained from a poly(ethylene terephthalate) (hereinafter abbreviated to PET) fiber, a nylon 6 fiber, and the like fiber, such as an astonishing soft feeling and drapability that have never been observed before, excellent stretchability, low temperature dye-affinity and weathering resistance. Asahi Chemical Corporation has solved many technological problems associated with the polymerization, spinning, processing, development of commercial articles, and the like of a PTT, and has recently put a PTT fiber on the market for the first time in the world under the trade name of Solo.

As explained above, the technologies related to the production of fibers from PTT have been developed to the level of industrialization. However, the following problems related to the polymerization of PTT still remain unsolved: a poly(trimethylene terephthalate) having a high intrinsic viscosity is difficult to obtain by melt polymerization alone when polymerization is carried out on an industrial scale, and the polymer tends to be easily colored. The polymerization of PTT on an industrial scale herein refers to polymerization on the following scales: for batch polymerization, polymerization on a scale of 0.3 t/batch or more, preferably 1 t/batch or more; for continuous polymerization, polymerization on a scale of 10 t/day or more, preferably 50 t/day or more.

For example, polymerization of PTT becomes understandable when the polycondensation reactivity of PTT is compared with that of poly(butylene terephthalate) (hereinafter abbreviated to PBT). For PBT, when polymerization is conducted using a batch-wise polymerizer equipped with a plate-like agitating blade in the presence of a titanium alkoxide catalyst at 260° C. as will be explained in Comparative Example 1, the polymerization degree increases with time. The polymerization degree further increases even when the polymer comes to have an intrinsic viscosity (intrinsic viscosity of 1.4 dl/g or more, polymerization degree of about 160) at which raking becomes difficult. In contrast to PBT, when PTT is polymerized even under the same polymerization conditions, the polymerization degree reaches a peak near an intrinsic viscosity of 0.8 dl/g (polymerization degree of about 100). Further extension of the polymerization time lowers the polymerization degree on the contrary. Moreover, such a peaking phenomenon of the intrinsic viscosity (polymerization degree) in the polymerization of PTT becomes more significant when the polymerization scale becomes larger.

In order to use PTT for clothes and industrial fibers, PTT usually must have an intrinsic viscosity of 0.85 dl/g or more in view of the manifestation of the strength. However, production of PTT having such a viscosity by conventional melt polymerization alone on an industrial scale has been impossible. For example, U.S. Pat. No. 5,798,433 and EP 1/046,662 describe a process for producing PTT showing excellent whiteness and an intrinsic viscosity of 0.85 dl/g or more. However, the descriptions of both of these references are based on experiments carried out on a scale of no more than several liters. Expansion of the polymerization scale in the disclosed process to an industrial scale only results in the production of a polymer having problems with quality such as mentioned below. The intrinsic viscosity of the polymer cannot be as high as 0.85 dl/g or more. A polymer obtained by excessively extending the polymerization time is colored, or tends to be colored when used in the air for a long time. The polymer shows a decrease in the molecular weight in a large proportion during melt molding.

In order to establish a technology of polymerizing PTT having an intrinsic viscosity of 0.85 dl/g or more by melt polymerization alone even on an industrial scale, the present inventors have analyzed the cause of the peaking phenomenon of an intrinsic viscosity (polymerization degree) in the melt polymerization of PTT, and clarified the following matter.

Elementary reactions forming the polycondensation reaction of PTT are mainly the following two reactions:

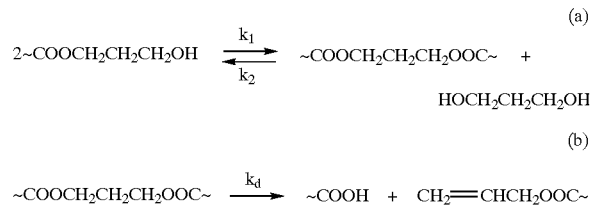

The forward reaction is a chain growth reaction (formula (a)) effected by removal of PDO of two terminal hydroxyl groups. The backward reactions include a reaction in which the ester portion suffers decomposition with PDO that has not been excluded from the reaction system (backward reaction of the formula (a)), and the thermal decomposition reaction (formula (b)) of the ester portion.

First, a case in which efficient discharge of PDO from the reaction system is achieved is considered. In this case, because the equilibrium is inclined to the forward reaction side, the backward reaction of the formula (a) can be ignored. When the forward reaction alone of the formula (a) is dominant, the intrinsic viscosity monotonously increases with time. For example, the polycondensation reactions of PET and PET approximately correspond to the above reaction. However, for PTT, because the allyl terminal ($CH_2$=$CHCH_2OOC$~) of the thermal decomposition product is thermodynamically stabilized, the thermal decomposition reaction rate ($k_d$) is significantly large. As a result, the reaction of the formula (b) contributes much in a relatively short period of time as the polycondensation reaction proceeds. The reaction of the formula (b) therefore becomes dominant over the forward reaction of the formula (a). The levelling off phenomenon of the intrinsic viscosity in the melt polymerization of PTT as explained above is estimated to take place due to the dominant reaction of the formula (b).

Next, the case in which efficient discharge of PDO is not achieved will be considered. For example, the case in which the scale of polymerization is extremely increased, that is, polymerization on an industrial scale corresponds thereto. When the polymerization scale is increased, the specific surface area of the reactant drastically decreases. Discharge of PDO therefore becomes difficult, and PDO remaining in the reaction system breaks the ester bond of PTT (backward reaction of the formula (a)). As a result, contribution of the backward reaction of the formula (a) becomes significant, resulting in no increase in the intrinsic viscosity. The significant contribution is estimated be the reason why the peaking phenomenon of an intrinsic viscosity takes place in an early stage when the polymerization scale is increased.

Accordingly, the present inventors have discovered that the following procedures are essential as means for increasing a finally attained polymerization degree of PTT in melt polymerization alone regardless of the polymerization scale: inhibition of the backward reaction of the formula (a) and the reaction of the formula (b), namely, 1) advancement of the polycondensation reaction in a state in which the thermal decomposition reaction less contributes and 2) efficient discharge of PDO from the reaction system.

An object of the present invention is to provide a PTT excellent in shade, oxidation resistance stability and melt stability and having a molecular weight in a range from low to high even when the PTT is prepared by polymerization on an industrial scale. Another object of the present is to provide a polymerization process capable of producing a PTT having a molecular weight in a range from low to high regardless of the charging scale of the monomer in the polymerization of the PTT having excellent properties as mentioned above, more specifically to provide a polymerization process of PTT capable of inhibiting thermal decomposition in the polycondensation reaction and efficiently discharging PDO.

Figure 1:
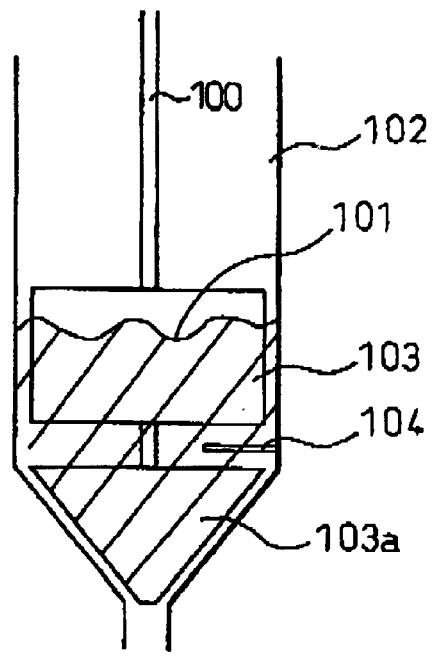
FIG. 1 schematically shows a polymerization apparatus used in the reaction example in Comparative Example 1 or 2, and an example of an agitating state of a reactant in the step of a polycondensation reaction.
Figure 4:
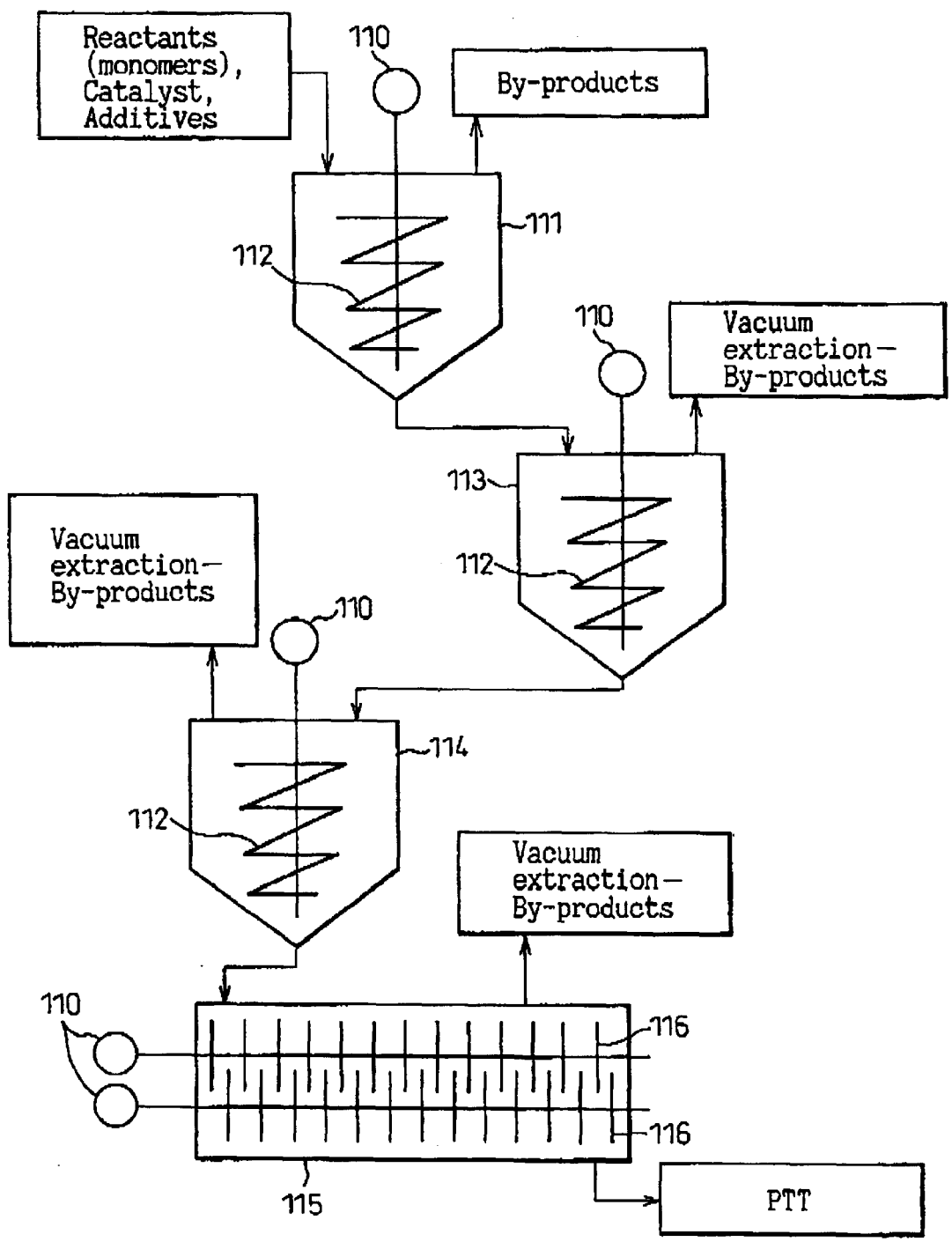
FIG. 4 is a process flow chart showing an arrangement example of a polymerizer in the embodiments of the present invention in a continuous polymerization process (Examples 4, 5).

In the figures, the reference numerals designate as follows:

100 - - - rotary axis
101 - - - solution surface of a reactant during stirring
102 - - - reaction vessel
103 - - - agitating blade
103a - - - lower agitating blade
103b - - - helical blade
104 - - - temperature detector end
105 - - - film-like reactant drips
106 - - - fixed lattice
107 - - - cylindrical reaction vessel
108 - - - flow of a reactant
109 - - - discharge direction of a polymer
110 - - - motor
111 - - - esterification reaction vessel
112 - - - helical agitating blade
113 - - - a first polycondensation reaction vessel
114 - - - second polycondensation reaction vessel
115 - - - third polycondensation reaction vessel
116 - - - disc type agitating blades In addition, agitating blades in FIG. 4 are disc-like, and are each fixed to either one shaft or another shaft while the shaft are connected to two motors, respectively. The shafts are rotated therewith. The lower portion of any one of the blades fixed to the upper shaft except the left end one in the figure occupies a space between the upper portions of two adjacent lower blades fixed to the lower shaft. Rotation of the rotary shaft scrape up a reactant in the lower portion of the reaction vessel.

DISCLOSURE OF THE INVENTION

In order to obtain a high molecular weight PTT by melt polymerization alone, the present inventors have investigated a polymerization process comprising inhibiting the thermal decomposition reaction and discharging PDO efficiently, As a result, they have found the possibility that a high molecular weight PTT can be produced when the polycondensation reaction is advanced while contribution of the thermal decomposition reaction is insignificant, that is, when discharge of PDO from the reaction system is conducted sufficiently (inhibition of the backward reaction in the formula (a)), and when the polycondensation reaction can be carried out in a short period of time (inhibition of the formula (b)) while there are many terminal hydroxyl groups. They therefore investigated in more detail and achieved the present invention.

That is, the first of the present inventions is a PTT comprising 80% by weight or more of trimethylene terephthalate units based on the entire repeating units, and satisfying the following conditions (1) and (2):

(1) the intrinsic viscosity is from 0.4 to 1.5 dl/g; and
(2) $[-OH]/([-OH]+[-COOH]+[-CH_2CH=CH_2]) \times 100 \geq 40$ The second of the present inventions is a process for producing a PTT wherein terephthalic acid or/and its lower alcohol ester is reacted with PDO to form PDO ester of terephthalic acid and/or its oligomer, and the polycondensation reaction of the reactant is conducted to give a PTT containing 80% by weight or more of trimethylene terephthalate units based on the entire repeating units, the process comprising conducting the polycondensation reaction while the formula (1) is being satisfied:

$$[-OH]/([-OH]+[-COOH]+[-CH_2CH=CH_2]) \times 100 \geq 40 \quad (1)$$

wherein $[-OH]$, $[-COOH]$ and $[-CH_2CH=CH_2]$ represent a terminal hydroxyl group content, a terminal carboxyl group content and a terminal allyl group content of the poly(trimethylene terephthalate), respectively.

The PTT of the present invention is a PTT comprising 80% by weight or more of trimethylene terephthalate units based on the entire repeating units.

The PTT of the present invention may contain less than 20% by weight of repeating units other than the trimethylene terephthalate units based on the entire repeating units. There is no specific limitation on the monomer forming such repeating units as long as the monomer is other than terephthalic acid or its lower alcohol ester, and PDO; examples of the monomer include diols, dicarboxylic acids, dicarboxylic acid esters, dicarboxylic acid amides and oxycarboxylic acids. Specific examples of the ester-forming monomer include diols such as ethylene glycol, 1,2-propanediol, 1,4-butanediol, 1,5-pentanediol, 1,6-hexanediol and 1,4-cyclohexanedimethanol, dicarboxylic acids such as oxalic acid, malonic acid, succinic acid, glutaric acid, adipic acid, isophthalic acid, 2,6-naphthalenedicarboxylic acid, biphenyldicarboxylic acid, 5-sodium sulfoisophthalic acid, 5-potassium sulfoisophthalic acid, 5-lithium sulfoisophthalic acid, 2-sodium sulfoterephthalic acid, 2-potassium sulfoterephthalic acid, 4-sodium sulfo-2,6-naphthalenedicarboxylic acid, 2-sodium sulfo-4-hydroxybenzoic acid and tetrabutylphosphonium 5-sulfoisophthate, esters of such dicarboxylic acids with lower alcohols such as methanol, oxycarboxylic acids such as oxyacetic acid and oxybenzoic acid, esters of such oxycarboxylic acids with lower alcohols such as methanol, and polyols such as poly(ethylene glycol) and poly (tetramethylene glycol) having a molecular weight of from 200 to 100,000. Two or more types of ester-forming monomers may optionally be copolymerized. Moreover, a copolymerization component formed in the step of polymerization, for example, a dimer of PDO (bis(3-hydroxypropyl) ether, hereinafter abbreviated to BPE) may be copolymerized. BPE is formed when PDO and 3-hydroxypropyl group at the PTT molecular terminal further react with PDO in the polymerization step, and further copolymerized with a PTT without further processing. Although BPE lowers the light resistance and heat resistance of a PTT, suitable copolymerization of BPE has the effects of increasing an exhaustion ratio of dye and spinning stability. Suitable copolymerization of BPE is therefore preferred, and BPE is copolymerized in a ratio of from 0.01 to 2% by weight, preferably from 0.04 to 1.2% by weight based on the polymer weight. Moreover, the PTT of the invention may contain a cyclic dimer formed by dimerizing a trimethylene terephthalate unit in an amount of 3% by weight or less based on the polymer weight. When the amount exceeds 3% by weight, the PTT unpreferably precipitates during molding to lower the process stability. The polymer preferably contains the cyclic dimer in an amount of 1.5% by weight or less, more preferably 1.2% by weight or less, still more preferably 0.7% by weight or less in view of no presence of a spinning step and dyeing step, decreased yarn breakage and uneven dyeing.

The PTT of the present invention must have an intrinsic viscosity of from 0.4 to 1.5 dl/g. A PTT having an intrinsic viscosity of less than 0.4 dl/g becomes brittle, and is hard to handle. Moreover, a yarn obtained therefrom shows a low strength. There is no specific limitation on the upper limit of an intrinsic viscosity. However, when the intrinsic viscosity exceeds 1.5 dl/g, the PTT shows an excessively high melt viscosity. As a result, metering the PTT with a gear pump cannot be conducted smoothly, and the spinnability is lowered due to faulty discharging. The intrinsic viscosity of the PTT is preferably from 0.85 to 1.5 dl/g, particularly preferably from 0.87 to 1.35 dl/g in view of the manifestation of the strength of the yarn, resin, film, and the like.

The PTT according to the present invention may be copolymerized or mixed with various additives, for example, delustering agents such as titanium oxide, heat stabilizing agents, defoaming agents, orthochromatic agents, flame retardants, antioxidants, ultraviolet-ray absorbers, infrared-ray absorbers, nucleating agents, fluorescent brighteners, and the like. In particular, when titanium oxide is to be added as a delustering agent, titanium oxide is added in an amount of from 0.01 to 3% by weight based on the weight of the polymer.

In the production process of the present invention, use of heat stabilizing agents and coloring inhibitors is particularly preferred as a method of increasing shade, oxidation resistance stability and melt stability. Pentavalent or trivalent phosphorus compounds and hindered phenol antioxidants are preferred as heat stabilizing agents. Examples of the pentavalent or trivalent phosphorus compound include trimethyl phosphate, triethyl phosphate, tributyl phosphate, triphenyl phosphate, trimethyl phosphite, triethyl phosphite, triphenyl phosphite, phosphoric acid and phosphorus acid. Examples of the hindered phenol antioxidants include pentaerythritol tetrakis[3-(3,5-di-tert-butyl-4-hydroxyphenyl) propionate], 1,1,3-tris(2-methyl-4-hydroxy-5-tert-butylphenyl)butane, 1,3,5-trimethyl-2,4-6-tris(3,5-di-tert-butyl-4-hydroxybenzyl)benzene, 3,9-bis{2-[3-(3-tert-butyl-4-hydroxy-5-methylphenyl)propionyloxy]-1,1-dimethylethyl}-2,4,8,10-tetraoxaspiro[5,5]undecane, 1,3,5-tris(4-tert-butyl-3-hydroxy-2,6-dimethylbenzene) isophthalic acid, triethylglycol bis[3-(3-tert-butyl-5-methyl-4-hydroxyphenyl)propionate], 1,6-hexanediol bis[3-(3,5-di-tert-butyl-4-hydroxyphenyl)propionate, 2, 2-thio-diethylene-bis[3-(3,5-di-tert-butyl-4-hydroxyphenyl) propionate] and octadecyl-3-(3,5-di-tert-butyl-4-hydroxyphenyl)propionate]. These substances may be added in an amount of from 0.01 to 0.5% by weight, preferably from 0.02 to 0.1% by weight based on the PTT in view of both the polymerization rate and improvement of the whiteness. The addition amount is from 2 to 250 ppm, preferably from 5 to 150 ppm, particularly preferably from 10 to 150 ppm as an amount of phosphorus element in the polymer. Examples of the coloring inhibitor include cobalt compounds such as cobalt acetate and cobalt formate, and commercially available fluorescent brighteners. Such an inhibitor can be added in an amount of from 0.0001 to 0.1% by weight based on the PTT. These additives can be added at an arbitrary stage of the polymerization.

The PTT of the present invention must have the value of $[-OH]/([-OH]+[-COOH]+[-CH_2CH=CH_2])\times 100$ being 40 or more, wherein $[-OH]$, $[-COOH]$ and $[-CH_2CH=CH_2]$ represent a terminal hydroxyl group content, a terminal carboxyl group content and a terminal allyl group content of the PTT, respectively. Although there is no specific limitation on the units of these contents as long as the same units are used, milli-equivalent/kg is usually used. When the relationship is satisfied, a PTT excellent in shade and melt stability is obtained. The value of $[-OH]/([-OH]+[-COOH]+[-CH_2CH=CH_2])\times 100$ is preferably 50 or more, more preferably 60 or more.

Of the three types of terminal groups in the above formula, the specific values of $[-COON]$ and $[-CH_2CH=CH_2]$ are each preferably 35 mequivalent/kg polymer or less, more preferably 25 mequivalent/kg polymer or less, most preferably 20 mequivalent/kg polymer or less in view of the melt stability and oxidation resistance stability of the PTT.

The PTT of the present invention preferably has an L* value of 80 or more that shows a brightness of the polymer, more preferably 85 or more, for the purpose of realizing chromaticness of color during dyeing and the use of a pigment. For the same reason, the PTT preferably has a b* value of from −1 to 5 that represents a yellowness of the polymer, more preferably from −0.5 to 4.

The PTT of the present invention can be produced by a process wherein terephthalic acid or/and its lower alcohol ester is reacted with PDO to form PDO ester of terephthalic acid and/or its oligomer, and polycondensation reaction of the reactant is conducted to give a PTT containing 80% by weight or more of trimethylene terephthalate units based on the entire repeating units, the process comprising conducting the polycondensation reaction while the formula (1) is being satisfied:

$$[-OH]/([-OH]+[-COOH]+[-CH_2CH=CH_2])\times 100 \geq 40 \quad (1)$$

wherein [—OH], [—COOH] and [—CH$_2$CH=CH$_2$] represent a terminal hydroxyl group content, a terminal carboxyl group content and a terminal allyl group content of the PTT, respectively.

In the present invention, a known method can be used as the method of forming PDO ester of terephthalic acid and/or its oligomer by reacting terephthalic acid or/and its lower alcohol ester.

The reaction is called an esterification reaction when terephthalic acid is used, and an ester interchange reaction when a lower alcohol ester of terephthalic acid is used. Examples of the lower alcohol ester of terephthalic acid include dimethyl terephthalate, diethyl terephthalate and monomethyl terephthalate.

Terephthalic acid, a lower alcohol ester of terephthalic acid and PDO may be commercially available compounds, or they may also be recovered from PTT and PTT products. Their purity is preferably 95% or more, more preferably 98% or more, most preferably 99% or more. A lower alcohol ester of terephthalic acid is preferred to terephthalic acid in view of the polymerization rate, whiteness, oxidation resistance stability and melt stability of the PTT thus obtained, and it is also preferred in view of the ease with which the copolymerization ratio of BPE can be lowered. Of impurities contained in PDO, carbonyl group-containing compounds are preferred to be contained in an amount by weight of 1,000 ppm or less, more preferably 500 ppm or less based on the weight of the polymer in view of the whiteness of the polymer.

The charging ratio of PDO to terephthalic acid or a lower alcohol ester of terephthalic acid that is a polymerization starting material is preferably from 0.8 to 3 in terms of a molar ratio. When the charging ratio is less than 0.8, the ester interchange reaction hardly proceeds, and the finally attained intrinsic viscosity is small when the polycondensation reaction is finished. Moreover, when the charging ratio is greater than 3, the melting point is lowered, and the whiteness of the polymer tends to be lowered. The charging ratio is preferably from 1.4 to 2.5, more preferably from 1.5 to 2.3.

In order to allow the reaction to proceed smoothly, a catalyst is preferably used. Examples of the catalyst include titanium alkoxides represented by titanium tetrabutoxide and titanium tetraisopropoxide, metal oxides such as amorphous titanium oxide precipitates, amorphous titanium oxide/silica coprecipitates and amorphous zirconia precipitates, and metal carboxylates such as calcium acetate, manganese acetate, cobalt acetate and antimony acetate. Use of such a substance in an amount of from 0.01 to 0.2% by weight, preferably from 0.05 to 0.12% by weight based on the entire carboxylic acid component monomers is preferred in view of the reaction rate, whiteness of the polymer and thermal stability. The reaction temperature is 150° C. or more, preferably from about 200 to 250° C. The reaction can be conducted while by-product water and an alcohol such as methanol are being distilled off. The reaction time is usually from 2 to 10 hours, preferably from 2 to 4 hours. The reactant thus obtained is a PDO ester of terephthalic acid or/and its oligomer. The esterification reaction and ester interchange reaction may optionally be conducted successively and continuously in two or more reaction vessels.

A PTT can be produced by subjecting the PDO ester of terephthalic acid or/and its oligomer to a polycondensation reaction.

In the polycondensation reaction, a titanium alkoxide represented by titanium tetrabutoxide and titanium tetraisopropoxide or a metal oxide such as amorphous titanium oxide precipitate, amorphous titanium oxide/silica coprecipitates and amorphous zirconia precipitate is optionally added in an amount of from 0.01 to 0.2% by weight, preferably from 0.03 to 0.15% by weight based on the entire carboxylic acid component monomers. When the amount of the catalyst is extremely large, a thermal decomposition takes place, and the formula (1) to be described later is not satisfied. Moreover, when the amount is too small, the polymerization degree cannot be increased. The catalyst used in the esterification reaction and ester interchange reaction can be used as the polycondensation catalyst without further processing. Alternatively, the catalyst may be newly added. Of these catalysts, titanium-based catalysts are effective for any of the esterification reaction, ester interchange reaction and polycondensation reaction. The titanium-based catalysts are therefore the most preferred ones for the following reasons. When a titanium-based catalyst is added at the stage of the ester interchange reaction or polycondensation reaction, the polycondensation reaction can be conducted without newly adding it prior to the polycondensation reaction or by adding only a small amount even when the addition is necessary.

The polycondensation reaction must be conducted while the formula (1) is being satisfied:

$$[-OH]/([-OH]+[-COOH]+[-CH_2CH=CH_2])\times 100 \geq 40 \quad (1)$$

wherein [—OH], [—COOH] and [—CH$_2$CH=CH$_2$] represent the hydroxyl content, carboxyl content and allyl group content at the molecular terminals of the PTT, respectively. In addition, the unit in the [ ] is mequivalent/kg polymer.

The molecular terminals of the PTT are principally a hydroxyl group, a carboxyl group and an allyl group.

The left term of the inequality in the formula (1) shows the proportion of hydroxyl groups to the entire molecular terminal groups in the PTT that is being formed or that is to be formed. In the present invention, the left term must be 40% or more. When the value is less than 40%, contribution of the thermal decomposition reaction and discharge of PDO is slowed, and the intrinsic viscosity cannot attain 0.85 dl/g. Because the carboxyl groups and allyl groups are also a measure of the degree of thermal decomposition, the magnitude of the left term is preferably 50% or more, more preferably 55% or more, in view of not only the rate of attaining a desired polymerization degree but also the shade, oxidation resistance stability and melt stability of the polymer thus obtained.

A specific method of conducting the polycondensation reaction while the formula (1) is being satisfied is required to conduct discharge of PDO at high efficiency and to complete the polycondensation reaction before a drastic thermal decomposition of the PTT takes place. Such a polymerization method is recommended to satisfy the following two conditions: 1) the polycondensation reaction is conducted at temperature as low as possible so that a thermal decomposition hardly takes place; and 2) a polycondensation reactant is continuously raked upside from the deepest portion of the reaction vessel to form a thin film so that the discharge efficiency of PDO is enhanced, and the film is continually renewed so that PDO is discharged from the new surface. That is to say, the catalyst, stirring, vacuum degree, an amount of the catalyst, and the like in the polycondensation reaction must be adjusted so that the formula (1) is satisfied.

The temperature suited to 1) is preferably from 235 to 270° C., particularly preferably from 245 to 265° C. In addition, when the reaction temperature is raised while a large amount of PDO remains, the copolymerization ratio of BPE tends to exceed 2% by weight. It is therefore preferred that the reaction temperature be not raised to 255° C. or more until the remaining amount of PDO becomes 5% or less. Moreover, it is particularly preferred to conduct polycondensation reaction while the formula (2) mentioned below is being satisfied when the intrinsic viscosity of the polycondensation reactant is 0.5 dl/g or more, as a polymerization procedure satisfying 2). The vacuum degree during the polycondensation reaction is from 0.0001 to 2 torr, preferably from 0.01 to 0.7 torr.

$$S/V \geq 0.07 \qquad \text{formula (2)}$$

S: total surface area ($cm^2$) of the polycondensation reactant

V: weight (g) of the polycondensation reactant

S herein designates a total surface area of the portion of the polycondensation reactant contacted with the gas phase (that may be in a reduced pressure state) when the polycondensation reaction is conducted.

A specific method of measuring S will be shown below. The total surface area of the polycondensation product that is contacted with the gas phase is the sum of the following three terms: (a) the solution surface of the reactant present in the lower portion of the reaction vessel; (b) the surface of the reactant adhering to the agitating blade; and (c) the surface of the film-like reactant dripping from the agitating blade. S is measured by procedures as explained below. The interior of the polymerizer during stirring is visually observed, or pictures thereof are taken with a camera, or a film thereof is made with a video camera, or the like, and the surface state of the reactant is observed.

For example, when a reaction vessel as shown in FIG. 1 is used, it can be concluded from the observation of the polycondensation reaction taking place in the reaction vessel that (a) alone should be determined because neither (b) nor (b) is present. The cross-sectional area S of a reaction vessel 102 substantially corresponds to S.

Figure 2:
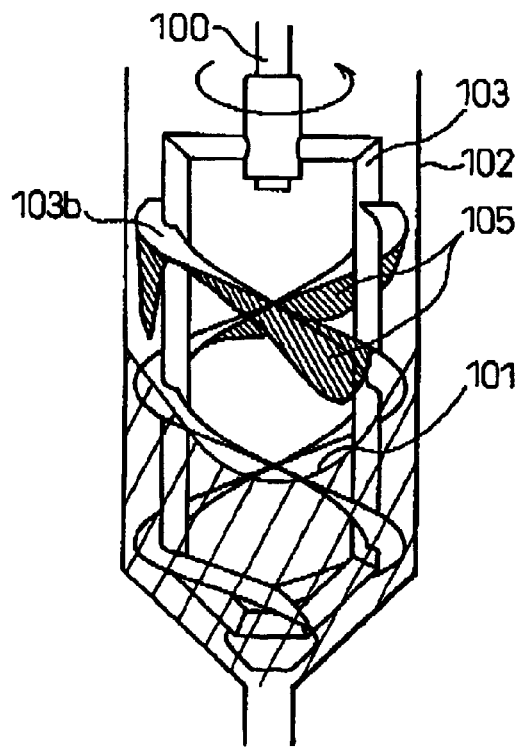
FIG. 2 schematically shows a polymerization apparatus used in the reactions in Examples 1, 3 and 8, and an example of an agitating state of a reactant in the step of a polycondensation reaction.

When a helical blade as shown in FIG. 2 is used and rotated in the direction to rake the reactant upside, the following phenomenon is observed. The reactant solution surface forms a reverse cone as shown in FIG. 2; the raked reactant adheres to the blade, is raised up, and finally drips on the reactant solution in the lower portion. Accordingly, the surface area in (a) can be determined by assuming the solution surface photographed with a camera to be a cone. The area in (b) can be determined from the front and back surfaces of a portion of the blade from the solution surface to the part where adhesion of the reactant disappears. The area in (c) can be determined by taking a picture of a dripping reactant at an instant, and obtaining the area of both surfaces from the picture. Because (C) varies to some extent with time, it is preferred to take the picture five times, and to obtain the average value of the five pictures. S can be obtained by totaling (a), (b) and (c) thus obtained. In addition, when a helical blade as shown in FIG. 2 is used, rotation of the rotary axis in the direction at which the reactant is raked downside forms a reactant surface as shown in FIG. 1. The rotary direction of the rotary axis therefore becomes important.

Figure 3:
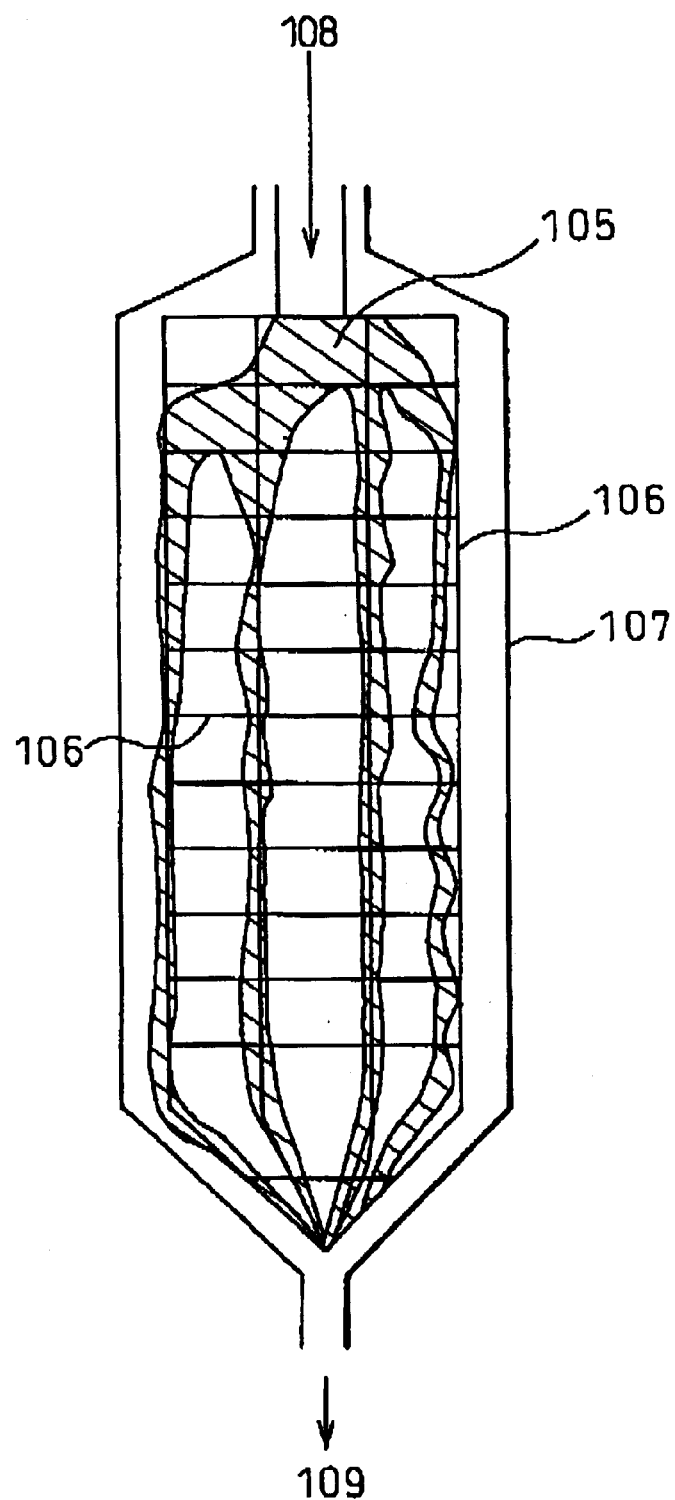
FIG. 3 schematically shows a polymerization apparatus used in the reactions in Examples 2 to 3, and an example of an agitating state of a reactant in the step of a polycondensation reaction.

When the reactant is allowed to creep over a fixed lattice and fall down as shown in FIG. 3, neither (a) nor (b) is present. The solution surface covered by the reactant at the stage of the polycondensation reaction is therefore photographed, and the area of the front and back surfaces (corresponding to (c)) is defined as S.

A horizontal agitation reaction apparatus as shown in FIG. 4 is similar to the apparatus in FIG. 2. In this case, the surface area is as follows: (a) is an area of the solution surface present in the lower portion of the reaction vessel; (b) is the sum of the front and back surface areas of the portion of agitating blades above the solution surface; and (c) is obtained in the same manner as in FIG. 2 by taking pictures with a camera.

The specific method of calculating S as explained above produces an error to some extent depending on the movement of the reactant. However, there is little arbitrariness by the operator making measurements, and the accuracy is sufficient for the definition of the present invention. On the other hand, V is a theoretical weight of a polymer obtained from the starting material placed in the vessel. Because the polycondensation reactant to be reacted has a fairly high polymerization degree, the weight is about equal to the theoretical weight of the polymer. For the polycondensation reaction in FIG. 4, the theoretical weight is equal to the weight of the polymer present in the reaction vessel in a stationary state.

The S/V ratio designates a surface area per unit weight of the polycondensation reactant, and represents the degree of surface renewal of the reactant during the polycondensation reaction. A larger value of S/V signifies that the surface renewal is actively conducted. As a result, removal of PDO that is a by-product is promoted, and the extent to which the reaction is influenced by the thermal decomposition is decreased. The polymerization degree can therefore be increased in a short period of time.

When the S/V ratio is less than 0.07 $cm^2$/g, efficient removal of PDO becomes difficult, and production of a PTT having a high polymerization degree, that is an object of the present invention, becomes difficult. Although a larger S/V ratio is better, an S/V ratio of 100 $cm^2$/g or less is preferred in view of the size of the polymerization vessel. An S/V ratio is preferably 0.1 $cm^2$/g or more, more preferably 0.15 $cm^2$/g or more. Moreover, the surface of the polycondensation reactant to be reacted is preferably continually renewed.

In addition, the condition for satisfying the formula (2) is that the reactant has an intrinsic viscosity of 0.5 dl/g or more. When the intrinsic viscosity is less than 0.5 dl/g, the reactant shows a low melt viscosity. As a result, satisfaction of the formula (2) is meaningless because discharge of PDO is easy even when the S/V ratio is less than 0.07 $cm^2$/g. Satisfaction of the formula (2) does not become an optimum condition for efficient discharge of PDO until the reactant has an intrinsic viscosity of 0.5 dl/g or more at which diffusion of PDO in the reactant and discharge of PDO from the surface thereof becomes difficult. The formula (2) may be easily satisfied even when the reactant has an intrinsic viscosity of less than 0.5 dl/g.

When the formula (2) is satisfied, it is preferred that the reactant be made to continually form a film by stirring. A preferred polymerization process forms, during the polymerization step, a film having a thickness of 20 mm or less, preferably 10 mm or less, most preferably 1 mm or less. Preferred polycondensation vessels where such a polycondensation reaction as mentioned above is conducted include:

a vessel wherein PDO ester of terephthalic acid or/and its oligomer obtained by an esterification reaction or ester interchange reaction is allowed to fall along a thin rod or lattice to form a film; a vessel wherein the ester or/and its oligomer in a film-like state are allowed to slide down along a slope; and a vessel wherein the ester or/and its oligomer are continuously raked up from the polymerization vessel with a helical blade, a cage-like blade, or the like, and they are made filmy during raking or during dripping after raking.

The process for producing a PTT of the present invention can be applied to both batch polymerization and continuous polymerization. It is important that the continuous polymerization includes at least the steps to be explained below in view of the polymerization reactivity, and the shade, oxidation resistance stability and melt stability of the polymer thus obtained. That is, it is preferred to use the following reaction vessel and polymerization apparatus: a reaction vessel for conducting at least one ester interchange reaction or/and esterification reaction to which terephthalic acid or/and its lower alcohol ester and PDO are continuously fed, and in which PDO ester of terephthalic acid and/or its oligomer can be continuously formed; and a polymerization apparatus in which two or more polycondensation reaction vessels are successively connected. Although one polycondensation reaction vessel may be used, at least two or more, preferably three or more polycondensation reaction vessels should be connected in series and used. The polycondensation reactant increases its polymerization degree as the product passes a plurality of the polycondensation reaction vessels. It is preferred to increase the reaction temperature and vacuum degree as the number of reaction vessels the reactant passes increases. The reactant preferably has an intrinsic viscosity of 0.3 dl/g or more, preferably 0.5 dl/g or more until it reaches the final polycondensation vessel.

The PTT thus obtained can be pelletized by a known method, and used as a raw material for fibers, molded articles and films. Moreover, the PTT may be fed to a molding machine to form fibers or films, or it may be injection molded or extrusion molded. Examples of the fiber include filaments, short fibers, side-by-side yarns, monofilament yarns and unwoven fabrics.

Moreover, in order to increase the polymerization degree of the PTT and decrease an amount of the cyclic oligomer, the PTT thus obtained may be subjected to solid phase polymerization. The PTT of the invention compared with the other PTTs shows a high solid phase polymerization rate, and is excellent in shade, oxidation resistance stability and melt stability. A known method can be applied as the solid phase polymerization method. That is, the PTT of the invention in pellets, powder, a fibrous state, a plate-like state, a block-like state, or the like state can be polymerized in a solid phase at temperature of from 170 to 220° C. for 3 to 100 hours in the presence of inert gas such as nitrogen or argon, or under a reduced pressure of 100 torr or lower, preferably 10 torr or lower. The PTT thus obtained can show an increase in the polymerization degree in terms of an intrinsic viscosity of 0.1 dl/g or more compared with that of the PTT at the end of melt polymerization. The final intrinsic viscosity can be made to attain 1.5 dl/g regardless of the intrinsic viscosity of the raw material PTT. Moreover, the solid phase polymerization can reduce an amount of the cyclic diner to less than 1.5% by weight.

BEST MODE FOR CARRYING OUT THE INVENTION

The present invention will be explained below by making reference to examples. However, the present invention is in no way restricted thereto. In addition, principal measured values in the examples were determined by the following procedures.

(1) Intrinsic Viscosity

Using an Ostwald viscometer and o-chlorophenol at 35° C., the ratio of a specific viscosity $\eta_{sp}$ to a concentration C (g/100 ml) $\eta_{sp}/C$ is measured, and the intrinsic viscosity [η] is obtained from the following formula by extrapolating the concentration to zero:

$$[\eta] = \lim_{C \to 0} (\eta_{sp}/C)$$

(2) Content of Terminal Carboxyl Groups (—COOH)

Benzyl alcohol in an amount of 25 ml is added to 1 g of a PTT, and the mixture is heated at 200° C. for 15 minutes in a nitrogen atmosphere. Three drops of a phenolphthalein indicator and 25 ml of chloroform are added to the mixture, and the content of terminal carboxyl groups is determined by titrating with a 0.02 N solution of potassium hydroxide in benzyl alcohol.

(3) Contents of Terminal Hydroxyl Groups ([—OH]) and Terminal Allyl Groups ([—CH$_2$CH=CH$_2$]) and Peak Areas of P1 and P2

A PTT is dissolved in a solvent mixture of $CDCl_3/(CF_3)_2CDOD$ (volume ratio of 1:1), and measurements are made using $^1$H-NMR (trade name of FT-NMR DPX-400, manufactured by Bruker). Tetramethylsilane is used as a reference.

(4) Amount of Bis(3-hydroxypropyl) Ether

A PTT in an amount of 2 g is added to 25 ml of a 2N solution of potassium hydroxide in methanol, and the mixture is refluxed for 4. hours so that solvolysis is effected. The amount is quantitatively determined by gas chromatography using the methanol solution. The amount is measured with a column (trade name of BOND DB-WAX, 0.25 mm×30 m (0.25 μm)) by heating a sample to temperature from 150 to 230° C. at a rate of 20° C./min while helium is being allowed to flow at a rate of 100 ml/min. A flame ionization detector is used as a detector.

(5) Oxidation Resistance Stability

A sample of the PTT thus obtained is held at 220° C. for 24 hours in the air. The b* value of the sample subsequent to the treatment is used as the index of oxidation resistance stability.

(6) Melt Stability

The melt stability is evaluated by an accelerated evaluation method as explained below. Spinning a PTT is conducted under the following conditions, and the melt stability is evaluated.

Extrusion temperature: 265° C.

Spinning nozzle: 36 holes having a diameter of 0.35 mmφ and a length of 0.7 mm being arranged in a single row Discharge amount: 23 g/min Winding rate: 4,000 m/min Lowering rate of viscosity: the lowering rate being obtained by cleaning the yarn thus obtained, measuring the intrinsic viscosity, and calculating the rate from the following formula:

melt stability (%)=(intrinsic viscosity of the yarn)/(intrinsic viscosity of the raw material PTT composition)×100

COMPARATIVE EXAMPLE 1

In a 3-liter autoclave equipped with a plate-like blade shown in FIG. 1, 1,300 g (6.7 moles) of dimethyl terephthalate (hereinafter abbreviated to DMT), 1,121 g (14.7 moles) of PDO and 0.78 g of titanium tetrabutoxide were charged, and the ester interchange reaction was conducted at 220° C. while methanol was being distilled off. The ester interchange reaction ratio was 95%. After completion of the ester interchange reaction, 0.52 g of titanium tetrabutoxide and 0.65 g of trimethyl phosphate were added to the reaction mixture, and the contents were stirred for 30 minutes. The polycondensation reaction was conducted at 260° C. by stirring the contents at 260° C., at a vacuum degree of from 0.1 to 0.5 torr, with the blade rotated at 100 rpm, while PDO was being distilled off. When the agitated state of the polycondensation vessel was observed with a video camera, the reactant formed a solution surface without forming a film, and was rotated integrally (see reference numeral 101 in FIG. 1). The integral rotation took place because the agitating blade cannot rake the reactant up due to its plate-like form.

The agitation torque increased with time during the polycondensation reaction, and the polymerization degree also increased. However, the agitation torque showed a peaking phenomenon about 4 hours after starting the polycondensation reaction. The agitation torque then changed to decrease slightly. A PTT sample taken at the stage where the agitation torque showed a peaking phenomenon had an intrinsic viscosity of 0.8 dl/g, an L* value of 87 and a b* value of 6.2. The formula (1) was not satisfied in the PTT polymerization. For example, the value of the left term in the formula (1) was 32% when the polycondensation reaction was completed. Moreover, the S/V ratio at the polymerization final stage was 0.05 cm$^2$/g.

Polymerization reaction was conducted separately using a 1,000-liter polymerizer with the charging ratio increased by a factor of 333. A similar phenomenon was also observed, and a PTT sampled at the stage of peaking phenomenon showed an intrinsic viscosity of 0.71 dl/g. The formula (1) was not satisfied in the polycondensation reaction of the PTT. For example, the left term of the formula (1) was 30% when the polycondensation reaction was completed, and the L* and b* values were 87 and 7.8, respectively. The S/V ratio in the polymerization final stage was 0.01 cm$^2$/g.

Furthermore, polymerization of the PBT was conducted separately, under the same condition as that described above except that 1,4-butanediol was used in place of PDO in the same amount in terms of number of moles. The condition was the same because the difference in melting point between the PTT and the PBT was small. The polymerization showed neither peaking of the agitation torque nor lowering of the polymerization rate even when polymerization was conducted for 4 hours. The polymer then showed an intrinsic viscosity of 1.0 dl/g. No peaking phenomenon was observed even when the scale of the experiment was enlarged to 1,000 liters.

Polymerization of PET was conducted using the same number of moles of ethylene glycol in place of PDO. Because the melting point of the PET was higher by about from 30 to 40° C. than that of the PTT, the polycondensation reaction temperature was set at 290° C. Polymerization was conducted under the same conditions except the reaction temperature. The polymerization of the PET showed neither peaking of the agitation torque nor lowering of the polymerization rate even when polymerization was conducted for four hours. The reactant showed an intrinsic viscosity of 1.0 dl/g when the polymerization was conducted for 4 hours. No peaking phenomenon was observed even when the scale of the experiment was enlarged to 1,000 liters.

It can be understood from the explanation above that the polymerization degree of the PTT is likely not to increase, and that the tendency becomes important as the polymerization scale is increased.

Table 1 summarizes the polymerization conditions and the properties of the PTT thus obtained.

EXAMPLE 1

The procedure of Comparative Example 1 was repeated by using the same reaction vessel (3 liters) as in Comparative Example 1 and charging the same amounts of reaction materials except that the reaction vessel was equipped with a helical type-agitating blade shown in FIG. 2. The measured values of the left term of the formula (1) were 85, 75, 64 and 51% according as 1, 2, 3 and 4 hours elapsed after starting the polycondensation reaction. The results showed that the formula (1) was satisfied during the polycondensation reaction. In addition, when the intrinsic viscosity was 0.5 dl/g or more, the S/V ratio was from 0.17 to 0.24 cm$^2$/g. when the polycondensation reaction was observed in the same manner as in Comparative Example 1, a portion of the reactant raised by the helical agitating blade dripped as shown by a reference numeral 105 in FIG. 2 to form a film. The film thickness was then confirmed to be 1 mm or less by observation from a window in the upper part of the vessel. The reactant in the vessel formed a large recess in the central portion of the vessel, and the surface area greatly increased. The reactant showed, 4 hours after the polycondensation reaction, an intrinsic viscosity of 1.0 dl/g, an L* value of 90, a b* value of 2.1, an amount of BPE of 0.17% by weight and an amount of the cyclic dimer of 2.63% by weight.

The polymerization reaction was separately conducted by increasing the charging ratio by a factor of 1,333 using a polymerization vessel having a capacity of 4,000 liters obtained by similarly enlarging the former reaction vessel. When the polycondensation reaction was conducted for 4 hours, the PTT showed an intrinsic viscosity of 0.95 dl/g, an L* value of 88 and a b* value of 3,4. The polycondensation reaction of the PTT satisfied the formula (1), and the left term of the formula (1) at the stage of the completion of the polycondensation reaction was 47%. Moreover, when the intrinsic viscosity of the reactant was 0.5 dl/g or more, the reactant showed an S/V ratio of 0.07 cm$^2$/g; the reactant contained 0.15% by weight of BPE, and 2.54% by weight of the cyclic dimer.

Table 1 summarizes the polymerization reaction conditions and the properties of the PTT.

EXAMPLE 2

Bis(3-hydroxypropyl) terephthalate was allowed to continuously flow down at 251° C. in a filmy state (see a reference numeral 105 in FIG. 3) along a lattice (106) fixed to the central portion of a cylindrical reaction vessel (107) in FIG. 3, and fall into a reservoir provided under the reaction vessel. The atmospheric pressure within the cylindrical reaction vessel was reduced to 0.5 torr, and the residence time during which the reaction solution falls into the reservoir was made 3 hours. When a portion of the reaction solution fell along the lattice, the state of a solution film was photographed with a video camera. The film thickness was measured, and was 1 mm or less. The polycondensation reaction was conducted while the formula (1) was being satisfied. For example, a sample was collected from the center of the lattice and another sample was collected from the reservoir, and the left term values of the formula (1) were determined. The left term value of the former sample and that of the latter sample were 74 and 58%, respectively. The PTT in the reservoir showed an intrinsic viscosity of 1.2 dl/g, an L* value of 90 and a b* value of 2.3. The PTT thus obtained contained 0.18% by weight of BPE and 2.42% by weight of a cyclic dimer.

Table 1 summarizes the polymerization reaction conditions and the properties of the PTT.

EXAMPLE 3

In a 3-liter autoclave equipped with a helical type agitating blade shown in FIG. 2, 1,112 g (6.7 moles) of terephthalic acid (hereinafter abbreviated to TPA), 1,121 g (14.7 moles) of PDO and 0.78 g of titanium tetrabutoxide were charged, and the ester interchange reaction was conducted at 250° C. while water was being distilled off. The ester interchange reaction ratio was 97% or more in the reaction. After completion of the ester interchange reaction, 0.52 g of titanium tetrabutoxide was added, and the contents were stirred for 30 minutes. The polycondensation reaction was conducted at 260° C. at a vacuum degree of from 0.1 to 0.5 torr while PDO was being distilled off and the formula (1) was being satisfied.

For example, the measured values of the left term of the formula (1) were 83, 74, 61 and 52% according as 1, 2, 3 and 4 hours elapsed after starting the polycondensation reaction. The values satisfied the formula (1). When the state of agitation was observed in the same manner as in Example 1, a portion of the reactant raised by the helical agitating blade dripped to form a film. The film thickness was 1 mm or less, Moreover, a large recess was formed in the central portion of the vessel, and the surface area greatly increased. The reactant showed, 4 hours after starting the polycondensation reaction, an intrinsic viscosity of 0.98 dl/g, an L* value of 91 and a b* value of 3.8, and contained 0.74% by weight of BPE and 2.32% by weight of the cyclic dimer.

The polymerization reaction was separately conducted by increasing the charging ratio by a factor of 1,333 using a polymerization vessel having a capacity of 4,000 l prepared by similarly enlarging the former vessel, When the polycondensation reaction was conducted for 4 hours, the PTT showed an intrinsic viscosity of 0.94 dl/g, an L* value of 90 and a b* value of 4.7. In addition, the polycondensation reaction of the PTT was conducted while the formula (1) was being satisfied. For example, the left term of the formula (1) at the stage of completion of the polycondensation reaction was 46%. The PTT thus obtained contained 0.86% by weight of BPE and 2.26% by weight of the cyclic dimer.

Table 1 summarizes the polymerization reaction conditions and the properties of the PTT.

EXAMPLE 4

A PTT was produced at a rate of 20 ton/day by continuous polymerization from starting materials of TPA and PDO containing 300 ppm or less of carbonyl group-containing compounds, using a continuous polymerization apparatus shown in FIG. 4. Three vertical agitation reaction apparatuses each having a spiral agitating blade were used for an esterification reaction vessel, a first and a second polycondensation reaction vessel, respectively. A horizontal agitation reaction apparatus having biaxial disc-like agitating blades was used for a third polycondensation reaction vessel.

Polymerization was conducted as explained below. A mixture in a slurry state prepared by adding to a slurry of TPA and PDO in a molecular ratio (TPA:PDO) of 1:1.5, 0.1% by weight of titanium tetrabutoxide based on TPA was continuously fed to the esterification reaction vessel, and polymerization was conducted at 230° C. under normal pressure for a residence time of 200 minutes while water was being discharged to give bis(3-hydroxypropyl) terephthalate and its oligomer having an intrinsic viscosity of 0.10 dl/g. Thereafter, 0.5% by weight of titanium oxide as a delustering agent and 20 ppm of trimethyl phosphate based on the PTT were added to the reactant. The reaction mixture was continuously introduced into the first polycondensation reaction vessel, and subjected to a polycondensation reaction at 250° C. under reduced pressure of 300 torr for a residence time of 60 minutes. The reactant (having an intrinsic viscosity of 0.15 dl/g) thus obtained was continuously introduced into the second polycondensation reaction vessel, and subjected to a polycondensation reaction at 250° C. under reduced pressure of 20 torr for a residence time of 60 minutes. The reactant (having an intrinsic viscosity of 0.30 dl/g) thus obtained was further continuously introduced into the third polycondensation reaction vessel, and subjected to a polycondensation reaction at 260° C. under reduced pressure of 1.5 torr for a residence time of 60 minutes. The left term value of the formula (1) was 68% at the final stage of the polycondensation reaction. The reactant in the third polycondensation reaction vessel showed an intrinsic viscosity of 0.5 dl/g or more and an S/V ratio of 1.5 cm$^2$/g when the reactant passed ⅓ of the polymerization vessel. The PTT finally obtained showed an intrinsic viscosity of 0.95 dl/g. an L* value of 88 and a b* value of 2, and contained 1.1% by weight of BPE. The present polymerization process can be continuously operated for one year or more.

Table 1 summarizes the polymerization reaction conditions and the properties of the PTT.

EXAMPLE 5

A PTT was produced at a rate of 20 ton/day by continuous polymerization from starting materials of dimethyl terephthalate and PDO containing 300 ppm or less of carbonyl group-containing compounds, using a continuous polymerization apparatus shown in FIG. 4. Three vertical agitation reaction apparatuses each having a spiral agitating blade were used for an esterification reaction vessel, a first and a second polycondensation reaction vessel, respectively. A horizontal agitating reaction apparatus having biaxial disc-like agitating blades was used for a third polycondensation reaction vessel.

Polymerization was conducted as explained below. Molten DMT at 180° C., PDO at 190° C. and 0.1% by weigh of titanium tetrabutoxide based on DMT were continuously fed to the esterification reaction vessel so that the molecular ratio of DMT:PDO became 1:2.5, and polymerization was conducted at 230° C. under normal pressure for a residence time of 100 minutes while methanol was being discharged to continuously give bis(3-hydroxypropyl) terephthalate and its oligomer having an intrinsic viscosity of 0.08 dl/g.

Thereafter, 0.5% by weight of titanium oxide, as a delustering agent, and 20 ppm of trimethyl phosphate based on the PTT were added to the reactant. The reaction mixture was continuously introduced into the first polycondensation reaction vessel, and subjected to a polycondensation reaction at 250° C. under a reduced pressure of 300 torr for a residence time of 60 minutes. The reactant (having an intrinsic viscosity of 0.1 dl/g) thus obtained was continuously introduced into the second polycondensation reaction vessel, and subjected to a polycondensation reaction at 250° C. under reduced pressure of 20 torr for a residence time of 60 minutes. The reactant (having an intrinsic viscosity of 0.30 dl/g) thus obtained was further continuously introduced into the third polycondensation reaction vessel, and subjected to a polycondensation reaction at 260° C. under reduced pressure of 1.5 torr for a residence time of 60 minutes. The left term value of the formula (1) was 68% at the final stage of the polycondensation reaction. The reactant in the third polycondensation reaction vessel showed an intrinsic viscosity of 0.5 dl/g or more and an S/V ratio of 1.5 cm$^2$/g when the reactant passed ⅓ or more of the polymerization vessel. The PTT finally obtained showed an intrinsic viscosity of 0.95 dl/g, an L* value of 90 and a b* value of 2.5, and contained 0.25% by weight of BPE and 2.56% by weight of the cyclic dimer. The present polymerization process can be continuously operated for one year or more.

Table 1 summarizes the polymerization reaction conditions and the properties of the PTT.

EXAMPLE 6

The pellets of the PTT obtained in a 4,000-liter polymerization vessel in Example 1 were subjected to solid phase polymerization at 205° C. in a nitrogen gas flow at a rate of 10 l/min for 30 hours. The PTT thus obtained showed an intrinsic viscosity of 1.35 dl/g, a left term in the formula (1) of 42%, an L* value of 92 and a b* value of 1.2, and contained 0.16% by weight of BPE and 1.00% by weight of the cyclic dimer. The PTT thus obtained was excellent in both the oxidation resistance stability and melt stability (melt spinning being conducted at 290° C.).

Table 1 summarizes the polymerization reaction conditions and the properties of the PTT.

EXAMPLE 7

The pellets of the PTT obtained in a 4,000-liter polymerization vessel in Example 3 were subjected to solid phase polymerization at 205° C. in a nitrogen gas flow for 40 hours. The PTT thus obtained showed an intrinsic viscosity of 1.39 dl/g, a left term in the formula (1) of 48%, an L* value of 92 and a b* value of 0.7, and contained 0.77% by weight of BPE and 0.97% by weight of the cyclic dimer. The PTT thus obtained was excellent in both the oxidation resistance stability and melt stability (melt spinning being conducted at 290° C.).

Table 1 summarizes the polymerization reaction conditions and the properties of the PTT.

EXAMPLE 8

The same reaction vessel (3 liters) as in Comparative Example 1 was used except that the reaction vessel was equipped with a helical agitating blade shown in FIG. 2, and the same charging amount as in Comparative Example 1 was used provided that the rotation rate of the blade was lowered to 5 rpm during the polycondensation reaction; the same investigation as therein was carried out. The measured values of the left term of the formula (1) were 78, 70, 52 and 41% according as 1, 2, 3 and 4 hours elapsed after starting the polycondensation reaction. The results showed that the formula (1) was satisfied during the polycondensation reaction. The S/V ratio was 0.05 cm$^2$/g when the intrinsic viscosity was 0.5 dl/g or more.

When 4 hours elapsed after starting the polycondensation reaction, the PTT showed an intrinsic viscosity of 0.83 dl/g, an L* value of 87 and a b* value of 4.6, and contained 0.17% by weight of BPE and 2.65% by weight of the cyclic dimer.

Table 1 summarizes the polymerization reaction conditions and the properties of the PTT.

COMPARATIVE EXAMPLE 2

In the experiment on a 1,000-liter scale in Example 1, the procedure of Example 1 was repeated except that the polymerization temperature was set at 282° C., and that the polycondensation reaction was conducted for 2 hours. The left term of the formula (1) was 30% when the polymerization was finished.

The PTT thus obtained showed an intrinsic viscosity of 0.80 dl/g, an L* value of 87 and a b* value of 8.7, and contained 0.17% by weight of BPE and 2.67% by weight of the cyclic dimer. The. PTT thus obtained showed insufficient oxidation resistance stability and melt stability. Moreover, the PTT was subjected to solid phase polymerization at 205° C. in a nitrogen gas flow for 40 hours. The resultant PTT showed an intrinsic viscosity of not greater than 1.21 dl/g. Furthermore, the left term of the formula (1) was 27.

Table 1 summarizes the polymerization reaction conditions and the properties of the PTT.

EXAMPLE 9

The PTT obtained in Example 1 was injection molded to form gears and connectors. The molded articles thus obtained were excellent in whiteness, and showed no substantial change in color when heated in the air at 130° C. for 24 hours. In contrast to the above articles, molded articles prepared from the PTT in Comparative Example 1 in the same manner as explained above were colored yellow, and showed a significant increase in yellowness when treated at 130° C. in the air for 24 hours.

EXAMPLE 10

A film prepared by injecting the PTT obtained in Example 1 at 265° C. through a die, 0.2 mm (width)×50 mm (length), was drawn at 135° C. in the longitudinal direction in a ratio of 1.5 and in the transverse direction in a ratio of 1.2 to give a tough film. The film thus obtained was not colored, and showed no substantial change in color when treated in the air at 130° C. for 24 hours. In contrast to the above film, a film prepared from the PTT obtained in Comparative Example 1, in the same manner as explained above was colored yellowish, and became significantly yellowish when treated at 130° C. in the air for 24 hours.

TABLE 1

|  | Polymerization conditions | | | | Properties of polymer | | | | | | | |
|---|---|---|---|---|---|---|---|---|---|---|---|---|
| Ex. | Amt. of DMT or TPA (kg) | Polymerization temp. (° C.) | X value* (%) | S/V (cm$^2$/g) | [η] (dl/g) | X value (%) | L* | b* | Amt. of BPE (wt. %) | Melt stability (%) | Oxidation resistance | Amt. of cyclic dimer (wt. %) |
| 1 | 1.3 | 260 | 51 | 0.17–0.24 | 1.0 | 51 | 90 | 2.1 | 0.17 | 94 | 17 | 2.63 |
|  | 1733 | 260 | 47 | 0.07 | 0.95 | 47 | 88 | 3.4 | 0.15 | 93 | 18 | 2.54 |
| 2 | — | 251 | 58 | 0.25 | 1.2 | 58 | 90 | 2.3 | 0.18 | 94 | 18 | 2.42 |
| 3 | 1.1 | 260 | 52 | 0.18–0.25 | 0.98 | 52 | 91 | 3.8 | 0.74 | 93 | 19 | 2.32 |
|  | 1482 | 260 | 46 | 0.13–0.21 | 0.94 | 46 | 90 | 4.7 | 0.86 | 90 | 20 | 2.26 |
| 4 | — | 260 | 68 | 1.5 | 0.95 | 68 | 88 | 2 | 1.1 | 94 | 19 | — |
| 5 | — | 260 | 74 | 1.5 | 0.95 | 74 | 90 | 2.5 | 0.25 | 96 | 16 | 2.56 |

TABLE 1-continued

| | Polymerization conditions | | | | Properties of polymer | | | | | | | | |
|---|---|---|---|---|---|---|---|---|---|---|---|---|---|
| | Amt. of DMT or TPA (kg) | Polymeriza-tion temp. (° C.) | X value* (%) | S/V (cm²/g) | [η] (dl/g) | X value (%) | L* | b* | Amt. of BPE (wt. %) | Melt stability (%) | Oxidation resistance | Amt. of cyclic dimer (wt. %) |
| 6 | — | — | — | — | 1.35 | 42 | 92 | 1.2 | 0.16 | 88 | 17 | 1.00 |
| 7 | — | — | — | — | 1.39 | 48 | 92 | 0.7 | 0.77 | 87 | 16 | 0.97 |
| 8 | 1.3 | 260 | 41 | 0.05 | 0.83 | 41 | 87 | 4.6 | 0.17 | 87 | 21 | 2.65 |
| C.E. | | | | | | | | | | | | |
| 1 | 1.3 | 260 | 32 | 0.05 | 0.8 | 32 | 87 | 6.2 | 0.23 | 82 | 24 | 2.67 |
| | 433 | 260 | 30 | 0.01 | 0.71 | 30 | 87 | 7.8 | 0.30 | 83 | 23 | 2.78 |
| 2 | 1.3 | 282 | 30 | 0.12–0.19 | 0.80 | 32 | 87 | 8.7 | 0.17 | 81 | 26 | 2.67 |

Note
*X value = [—OH]/([—OH] + [—COOH] + [—CH₂CH═CH₂]) × 100 (measured when polymerization is completed)

INDUSTRIAL APPLICABILITY

The present invention can provide a PTT having a molecular weight in a range from low to high and excellent in shade, oxidation resistance stability and melt stability even when the PTT is prepared by polymerization on an industrial scale. Moreover, because the solid phase polymerization rate of PTT is high, a PTT having a still higher molecular weight can be provided without suffering much thermal decomposition. The PTT thus obtained can be used for any of the applications such as fiber formation, resin molding and film formation.

What is claimed is:

1. A poly(trimethylene terephthalate) comprising 80% by weight or more of trimethylene terephthalate units based on the entire repeating units, and satisfying the following conditions:

(1) an intrinsic viscosity is from 0.4 to 1.5 dl/g;
    (2) a L* value is 80 or more and a b* value is from 1 to 5; and
    (3) [—OH]/([—OH]+[—COOH]+[—CH₂CH═CH₂])× 100≧40 wherein [—OH], [—COOH] and [—CH₂CH═CH₂] represent a terminal hydroxyl group content, a terminal carboxyl group content and a terminal allyl group content of the poly(trimethylene terephthalate), respectively.

2. The poly(trimethylene terephthalate) according to claim 1, wherein the poly(trimethylene terephthalate) further satisfies the following condition (4):

(4) bis(3-hydroxypropyl) ether is copolymerized in an amount of 2% by weight or less.

3. The poly(trimethylene terephthalate) according to claim 1, wherein the value of
[—OH]/([—OH]+[—COOH]+[—CH₂CH═CH₂])×100
is 50 or more.

4. A process for producing a poly(trimethylene terephthalate) wherein terephthalic acid and/or its lower alcohol ester is reacted with 1,3-propanediol to form 1,3-propanediol ester of terephthalic acid and/or its oligomer, and polycondensation reaction of the reactant is conducted to give a poly(trimethylene terephthalate) containing 80% by weight or more of trimethylene terephthalate units based on the entire repeating units, the process comprising conducting the polycondensation reaction at a temperature in a range of from 235 to 270° C. while the formula (1) is being satisfied and while formula (2) is maintained when an intrinsic viscosity for the polycondensation product reaches 0.5 dl/g or more:

[—OH]/([—OH]+[—COOH]+[—CH₂CH═CH₂])×100≧40    (1)

wherein [—OH], [—COOH] and [—CH₂CH═CH₂] represent a terminal hydroxyl group content, a terminal carboxyl group content and a terminal allyl group content of the poly(trimethylene terephthalate), respectively, and S/V≧0.07 cm²/g    (2)

wherein S represent a total surface area (cm²) of the polycondensation product and V represents a weight (g) thereof.

5. A process for producing a poly(trimethylene terephthalate), comprising solidifying the poly(trimethylene terephthalate) obtained by the process according to claim 4, and heating the poly(trimethylene terephthalate) in a solid phase, whereby the intrinsic viscosity is increased by 0.1 dl/g or more in comparison with that of the poly (trimethylene terephthalate) at the time when the polycondensation reaction is finished.

6. The process for producing a poly(trimethylene terephthalate) according to claim 4, wherein the value of
[—OH]/([—OH]+[—COOH]+[—CH₂CH═CH₂])×100
in (1) is 50 or more.

7. The process for producing a poly(trimethylene terephthalate) according to any one of claim 4, 5 or 6 wherein the S/V ratio is 0.15 cm²/g or more.

8. A process for continuously producing a poly (trimethylene terephthalate) containing 80% by weight or more of trimethylene terephthalate units based on the entire repeating units, at least comprising the following steps (1) to (5):

(1) preparing a polymerization apparatus in which one or more reaction vessels (A) for conducting an ester interchange reaction or/and an esterification reaction and two or more polycondensation reaction vessels are successively connected;
    (2) continuously feeding terephthalic acid and or its lower alcohol ester and 1,3-propanediol to the reaction vessels (A), whereby 1,3-propanediol ester of terephthalic acid and/or its oligomer is continuously formed;
    (3) continuously feeding the reactants formed in the step (2) to the polycondensation reaction vessels, whereby a polycondensation reaction is conducted while the polymerization degree is being increased when the reactants are successively passed through the two or more polycondensation reaction vessels;
    (4) conducting the polycondensation reaction while the formula (1) is being satisfied

[—OH]/([—OH]+[—COOH]+[—CH₂CH═CH₂])×100≧40    (1)

wherein [—OH], [—COOH] and [—CH₂CH═CH₂] represent a terminal hydroxyl group content, a terminal carboxyl group content and a terminal allyl group content of the poly(trimethylene terephthalate), respectively; and (5) conducting the polycondensation reaction in a final polycondensation reaction vessel at a temperature in a range of from 235 to 270° C. while the formula (2) is being satisfied when an intrinsic viscosity of the polycondensation product is 0.5 dl/g or more $$S/V \geq 0.07 \text{ cm}^2/\text{g} \tag{2}$$

wherein S represents a total surface area (cm²) of the polycondensation product and V represents a weight (g) thereof.

9. A process for producing a poly(trimethylene terephthalate), comprising solidifying the poly(trimethylene terephthalate) obtained by the process according to claim 8, and continuously or noncontinuously heating the poly (trimethylene terephthalate) in a solid phase, whereby the intrinsic viscosity is increased by 0.1 d/g or more in comparison with that of the poly(trimethylene terephthalate) at the time when the polycondensation reaction is finished.

10. A fiber, a resin product or a film formed from the poly(trimethylene terephthalate) according to any one of claim 1, 2 or 3.

11. A fiber, a resin product or a film formed from the poly(trimethylene terephthalate) obtained by the process according to claim 4 or 8.

* * * * *

UNITED STATES PATENT AND TRADEMARK OFFICE
CERTIFICATE OF CORRECTION

PATENT NO. : 6,740,400 B2
DATED : May 25, 2004
INVENTOR(S) : Jinichiro Kato et al.

It is certified that error appears in the above-identified patent and that said Letters Patent is hereby corrected as shown below:

Column 19,
Lines 37 and 38, "1 to 5" should read -- -1 to 5 --.

Column 20,
Line 52, "and or" should read -- and/or --.
Line 53, insert -- ester -- after "propanediol".

Column 22,
Line 4, "0.1 d/g" should read -- 0.1 dl/g --.

Signed and Sealed this

First Day of February, 2005

JON W. DUDAS
*Director of the United States Patent and Trademark Office*